(12) United States Patent
Robertson

(10) Patent No.: US 11,365,141 B2
(45) Date of Patent: Jun. 21, 2022

(54) PROCESS AERATION BALANCE CONTROLLER IN WASTEWATER TREATMENT

(71) Applicant: Ovivo Inc., Montreal (CA)

(72) Inventor: Calvin Robertson, Saratoga Springs, UT (US)

(73) Assignee: Ovivo Inc., Montreal (CA)

( * ) Notice: Subject to any disclaimer, the term of this patent is extended or adjusted under 35 U.S.C. 154(b) by 121 days.

(21) Appl. No.: 16/824,469

(22) Filed: Mar. 19, 2020

(65) Prior Publication Data

US 2020/0299162 A1   Sep. 24, 2020

Related U.S. Application Data

(60) Provisional application No. 62/820,595, filed on Mar. 19, 2019.

(51) Int. Cl.
*C02F 3/00* (2006.01)
*C02F 3/12* (2006.01)

(52) U.S. Cl.
CPC ............ *C02F 3/006* (2013.01); *C02F 3/1257* (2013.01); *C02F 2209/006* (2013.01); *C02F 2209/22* (2013.01); *C02F 2209/38* (2013.01)

(58) Field of Classification Search
CPC ........ C02F 3/006; C02F 2209/38; C02F 3/20; C02F 3/1257; C02F 2209/006

USPC .......................... 210/614, 143, 620, 739, 629
See application file for complete search history.

(56) References Cited

U.S. PATENT DOCUMENTS

| | | | |
|---|---|---|---|
| 7,186,332 B2 | 3/2007 | Curtis et al. | |
| 7,390,399 B2 | 6/2008 | Dennis, II et al. | |
| 8,057,674 B1 | 11/2011 | Leland et al. | |
| 8,318,016 B1 | 11/2012 | Leland et al. | |
| 9,011,690 B2 | 4/2015 | Leland | |
| 9,896,361 B2 | 2/2018 | Leland et al. | |
| 2012/0292251 A1* | 11/2012 | Palmer | C02F 3/121 210/614 |

* cited by examiner

*Primary Examiner* — Claire A Norris

(74) *Attorney, Agent, or Firm* — Thomas M. Freiburger

(57) ABSTRACT

An aeration balance controller in a wastewater treatment process allows for precise control of aeration medium in situations where the oxygen concentration must be controlled in more than one aeration zone or compartment, with reduced instrumentation. The system also has application controlling aeration media where the aeration of one or more zones may interfere with the stable control of aeration in another zone. This is accomplished by the use of two control schemes: one which determines the overall aeration effort required, and one or more controllers which adjust the balance between zones to equalize the process error from setpoint from zone to zone.

3 Claims, 6 Drawing Sheets

PROCESS AERATION BALANCE CONTROLLER IN WASTEWATER TREATMENT

This application claims benefit from provisional application Ser. No. 62/820,595, filed Mar. 19, 2019.

BACKGROUND OF THE INVENTION

The invention concerns aeration of multiple process zones, particularly in wastewater treatment, and the efficient control of that aeration.

Oxidation ditches are often segmented into zones or compartments. It is often necessary to control the dissolved oxygen (DO) concentration to different levels in each compartment. Furthermore, since the flow travels from one compartment to the next often a disturbance of DO concentration in one compartment travels downstream to affect the next compartment.

Traditional diffused air aeration control systems fall into one of two categories, relative to how the air supply is controlled. In a pressure based system, the valve to each compartment or zone is controlled directly by the DO concentration. As demand increases the valves open further admitting more air. This causes the pressure in the supply header to drop. The compressor that provides the supply of forced air increases its output in order to bring the header pressure back up to its setpoint. As demand decreases, the valve for each zone closes, increasing the header pressure. The compressor then reduces its output to lower header pressure to the setpoint.

This control strategy has several disadvantages: First, depending on the combination diffuser and compressor type, this system may be slow to respond to changes in demand. And second, because the system requires a certain pressure drop across each control valve, more energy is consumed in providing excess pressure.

An increasingly common control strategy in the industry is a flow based strategy. An example of this configuration is shown in FIG. 3. This system is often implemented with two proportional-integral-derivative (PID) controllers in a cascade relationship. The master loop is the DO loop. This controller attempts to meet a DO setpoint by changing flow in the aeration zone. The output from this controller (in flow rate) is sent to the slave controller as a setpoint. This flow controller opens or closes the zone valve in order to meet the requested flow. The compressor in this strategy has its own flow loop for the overall system. It determines the required air flow by summing the flow requirements for all zones on the header and adjusting its speed to meet these requirements.

This flow based system solves the problems of the pressure based system. The system responds very quickly to demand changes. When a zone needs more flow, the valve opens more and the blower increases its speed simultaneously. Energy efficiency is also improved as most of the energy is used to develop flow, and very little is used on generating excess system pressure. Using a strategy called most open valve (MOV), the valve with the highest demand is parked at a set position that is most of the way open. The other valves on the header are still in control and adjust to meet their flow setpoint. Theoretically the remainder of flow not consumed by these valves is the flow required by the fixed (Most Open) valve.

The flow based model isn't without drawbacks. First, significantly more instrumentation is required. This is because each zone drop needs its own flow meter. Depending on system configuration, this flowmeter requirement can increase piping requirements as well. All current flow instrumentation technologies require a certain amount of straight pipe run leading up to and away from the instrument. This is because the air flow must be laminar at the instrument to get an accurate reading, and piping bends introduce turbulence. In systems with multiple parallel trains, a main header usually splits into several sub-headers that provide flow to each train. These sub-headers usually are running down a narrow walkway between trains, and this space limitation requires extra piping to be installed next to the header to provide the straight run needed for the flow meter on each drop.

In addition to the piping and instrumentation requirements, the header can also experience stability problems. When one zone adjusts its flow, it can create a ripple effect where other valves on the header have to adjust their flow to compensate for the disturbance created by the first valve moving. The amount of valves needing to adjust can be sizeable in a multi-train system with multiple air drops per train.

With both systems, each zone operates independently from other zones. This means that a disturbance in a zone where the DO is really high or low propagates to downstream zones, requiring each zone to compensate for the disturbance.

SUMMARY OF THE INVENTION

The aeration balance controller of the invention is an assembly of equipment carrying out several arithmetic functions combined with two process controllers. These process controllers could be PID controllers, or time-increment (step) controls. The assembly as whole can be easily implemented in Programmable Logic Controller (PLC), microcontroller, or PC. The system adjusts air flow among a plurality of aeration zones so that the zones are in proper balance relative to one another regardless of whether air flow to each zone is above or below setpoint. Error from setpoint will be made proportionally the same for all zones. The system averages the error signals of the zones and adjusts overall air flow accordingly, so that each zone will return to setpoint.

DESCRIPTION OF PREFERRED EMBODIMENTS

Components

The functions (components of the controller) are numbered on FIG. 1 and are as follows:

1. Zone Error Computation—The system begins by computing the deviation or error (Setpoint—Measured Value or PV) of dissolved oxygen (DO) of each zone.

These error values are passed to both the differential computation and average function.

2. Error differential computation—The error from one zone is subtracted from the error of the other zone. This determines how close numerically the errors are, and how much correction is needed in one of them to balance the errors; if both errors are identical, the result is zero indicating perfect balance between the two zones.

3. Differential Controller—The output from the differential computation is used as the measured variable for the differential controller. The target value is zero indicating that both zones are balanced and no controller action occurs. If the differential is negative, for example, in subtracting zone 2's error from zone 1's error, zone 2 needs more aeration and the controller increases its output for zone 2 (or decreases output for zone 1) in a way toward balance. If the differential is positive, the controller does the opposite, to change its output in a way toward balance. This control can be PID or step controller, or even other forms of control (fuzzy logic, AI, etc.).

Figure 5:
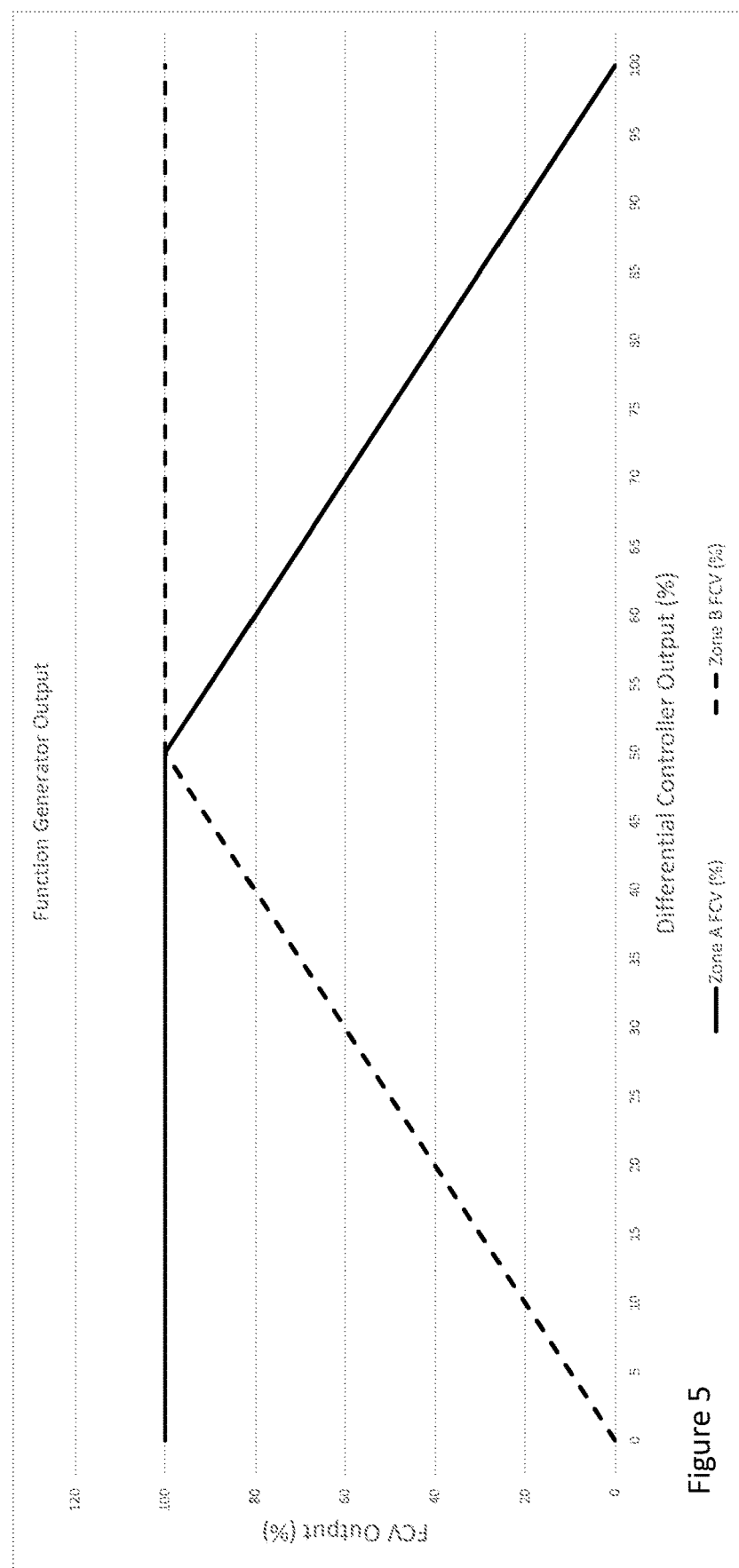
FIG. 5 is a graph showing one aspect of the invention.

4. Output Function Generator—The output from the differential controller is processed by a function or group of functions to split the output into two signals. One signal is directly proportional to the output of the controller (increases with an increase of controller output), while the other signal is inversely proportional (decreases with an increase of controller output). In a diffused air system, these outputs are sent directly to the flow control valves at each air drop (zone). FIG. 5 is a graph showing function generator output with valve response. As noted above, in one preferred manner of operation one of the two flow control valves will always be open. From left to right the graph illustrates conditions ranging from highest bias to zone A (zone 1), to equal (both fully open), to highest bias to zone B (zone 2). In the left half the zone A valve remains fully open while the zone B valve changes from nearly closed to fully open. In the right half the zone B value remains fully open while the zone A valve goes to nearly closed. Through the valve conditions the total combined flow to the two zones remains constant except as modified by the average controller.

5. Error averaging—Separate from the differential controls discussed above, the errors of both zones are averaged. An average of 0 indicates that total aeration is on setpoint.

6. Error Average Controller—The average of the zone errors is used as the measured variable for the average controller. The purpose of this controller is to control the overall aeration level requirements of the train to meet requirements. Like the differential controller, the target is zero. If the average (summation) is zero, no controller action happens. If the value is positive, the controller reduces its output, via the flow controller 11 (FIC-100) and the flow control valve 12 (FCV-100) controlling air flow from the supply through a duct or common header 13. The valve has a feedback loop including a flow rate sensor/transmitter 14 (FIT-100). If the value is negative, the controller output is increased. Also like the differential controller, this control can be a step or PID controller. The output of this controller is a setpoint to an external control that controls the overall aeration. In a diffused air system this would be some kind of flow control for the entire header, which is here illustrated as the valve 12.

The functions of the differential controller and of the error average controller can be simultaneous. With this system the DO setpoint for each zone is not "chased", which could result in back and forth imbalances. Instead the zones are balanced as to the deviation of each from its setpoint, and at the same time, the deviations of the two zones are combined to get a net overall aeration deviation, and overall system air flow is adjusted accordingly.

Figure 1:
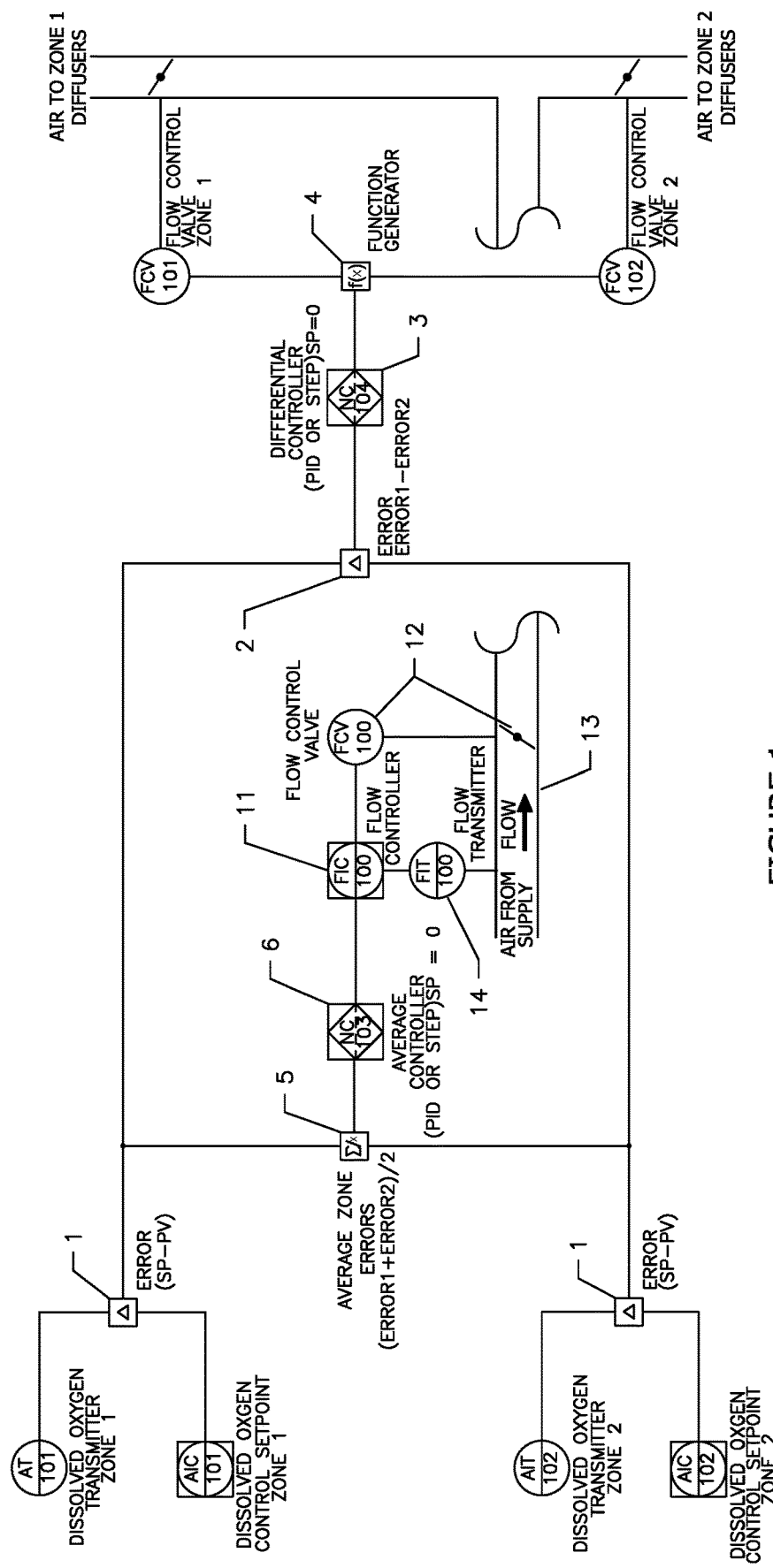
FIG. 1 is a schematic illustration of components of the invention.
Figure 2:
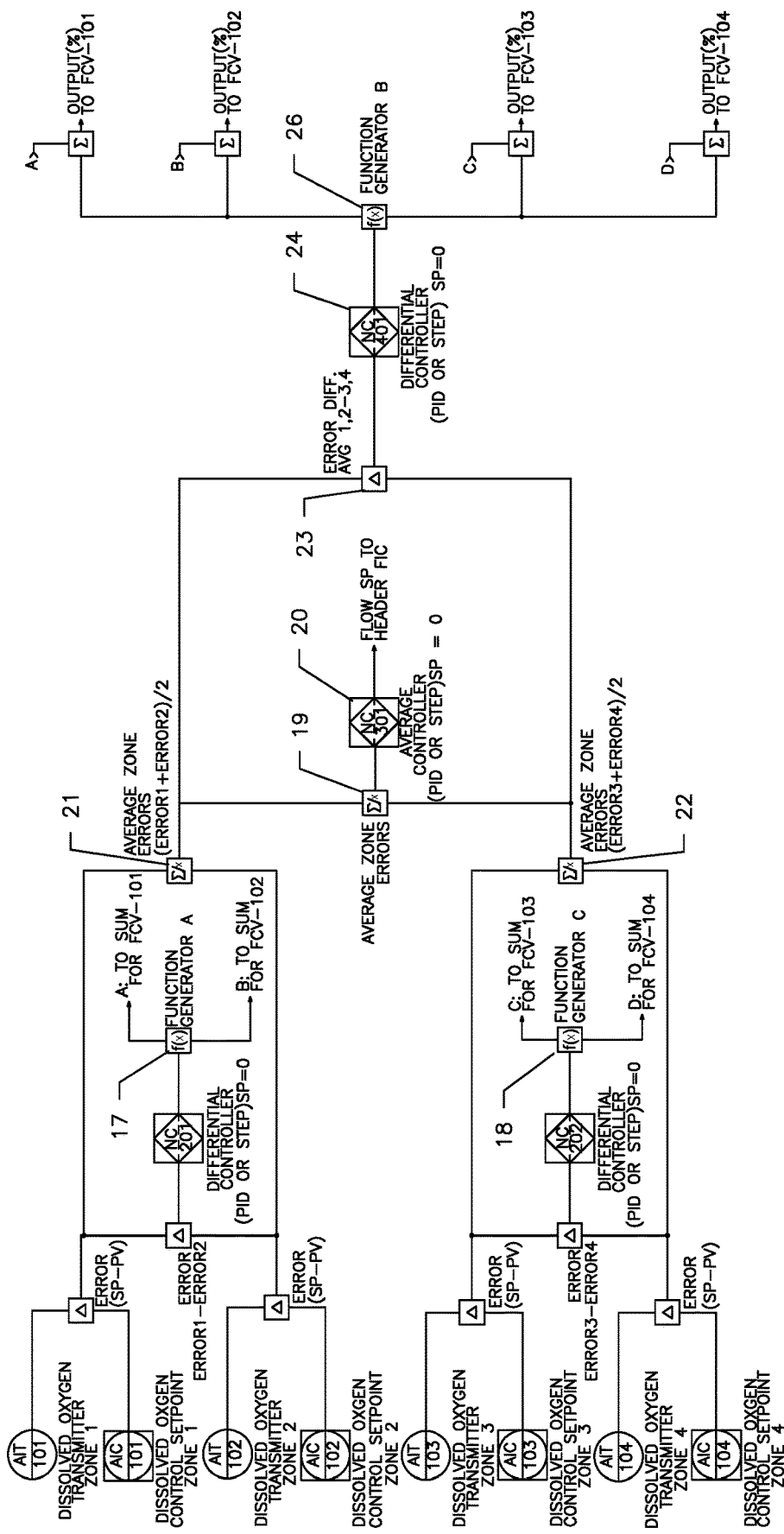
FIG. 2 is another schematic drawing, showing the system with twice the number of zones shown in FIG. 1.
Figure 3:
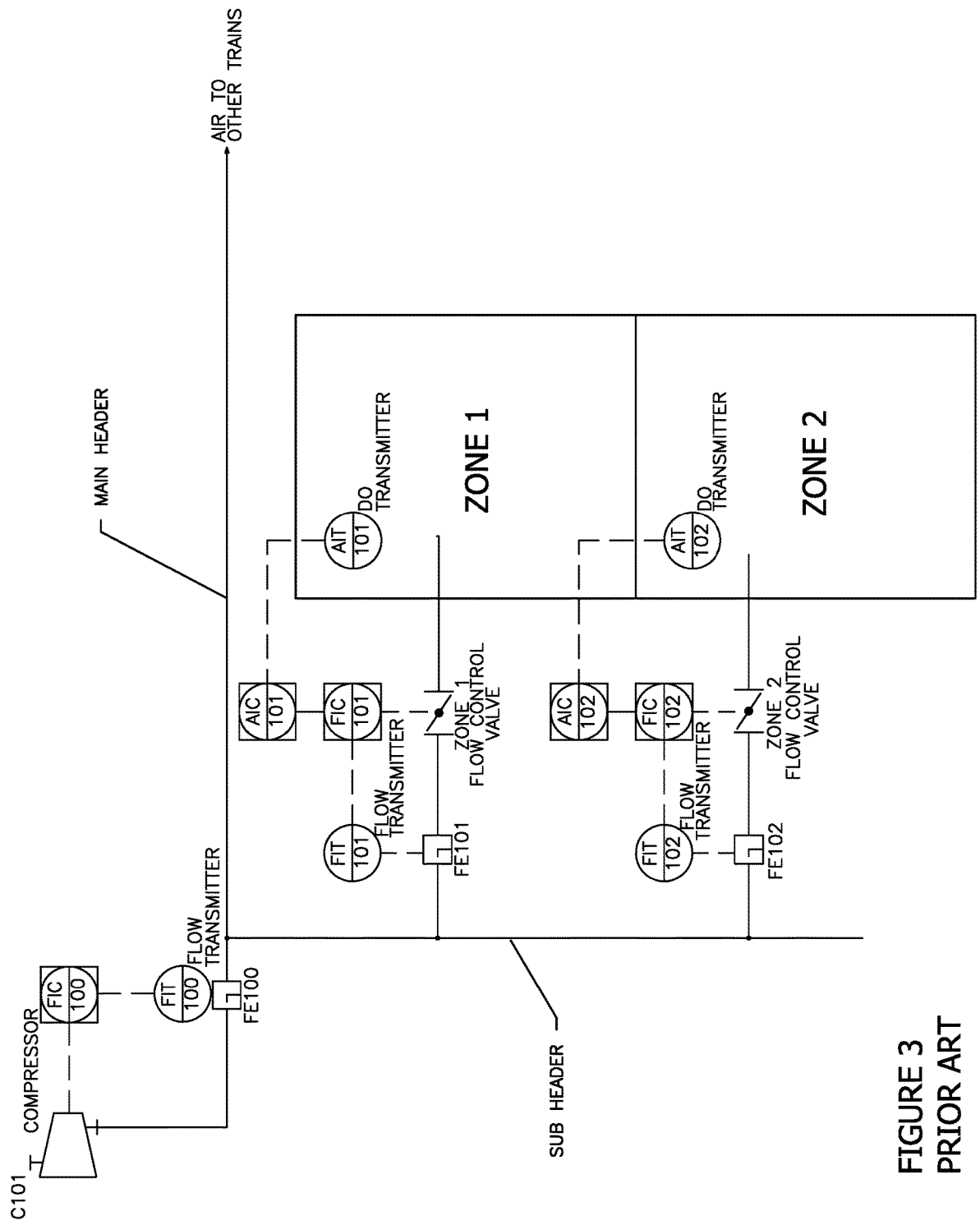
FIG. 3 is a schematic illustration of prior art.

FIG. 2 shows a variation with more zones. It is important to note that while the components above would control a train with two zones, the scope of control could be expanded to more zones. For example a four zone train could be divided into two banks with two zones each, as shown. Each bank balances itself with a differential controller. The average of errors for each bank is cascaded into another differential controller to balance the two banks. Then an average of the error of all zones is used to control the overall flow. An example of this configuration is found in FIG. 2. This configuration could also be used to control an odd number of zones such as three zones. The only change would be an adjustment to the output function generator of the bank differential controller to compensate for the difference in process gains. In FIG. 2 the function generators 17, 18 for zones 1-2 (A-B) and 3-4 (C-D) are schematically indicated as sending control signals to flow control valves (FCV-101 and -102 for zones A and B, and FCV-103 and -104) for zones C and D, shorthand for what is shown in FIG. 1.

Note that the average of all zone errors, indicated at 19, is in a signal to an average controller 20 just as in the controller 6 in FIG. 1, and that controller controls flow from an air supply source to regulate overall air supply to all zones, as in FIG. 1. The air supply duct, flow control valve, etc. of FIG. 1 are assumed as present, but not shown in FIG. 2.

In FIG. 2 the signals sent from function generators 17 and 18 serving their respective banks of aeration zones are shown as sending a signal that becomes part of a sum, and FCV-101, zone A, also indicates a summation. This reflects the fact that each flow control valve (at right side of FIG. 2) will receive a signal that is combined from two separate signals: the signal to balance the two valves of the respective bank of valves; and a signal for balancing of the two banks, A and B vs. C and D. As indicated in FIG. 2, average of the A/B zone errors and the C/D zone errors are taken at 21 and 22 for the respective banks. These average signals are then differentiated at 23 to find error difference between the average for zones 1 and 2 and the average for zones 3 and 4. This is fed to a differential controller 24 (NC 401), and fed to a function generator 26. The signals from the function generator are for increase opening/decrease opening for the two banks to balance (equalize) the errors from setpoint in the two banks. All these controls are preferably done simultaneously, so that zone A's flow control valve receives a combined signal (summation) from function generators 17 and 26. The same is true for zone B, and also for zones C and D receiving a combined signal from function generators 18 and 26.

After the balancing of errors within each bank and between the two banks, all of the zones would typically have either positive or negative error (although it could be zero). This is adjusted by the overall air flow control, as discussed above and as shown in FIG. 1. Note that this overall air adjustment can also be carried out simultaneously with the intrabank and interbank adjustments.

Figure 6:
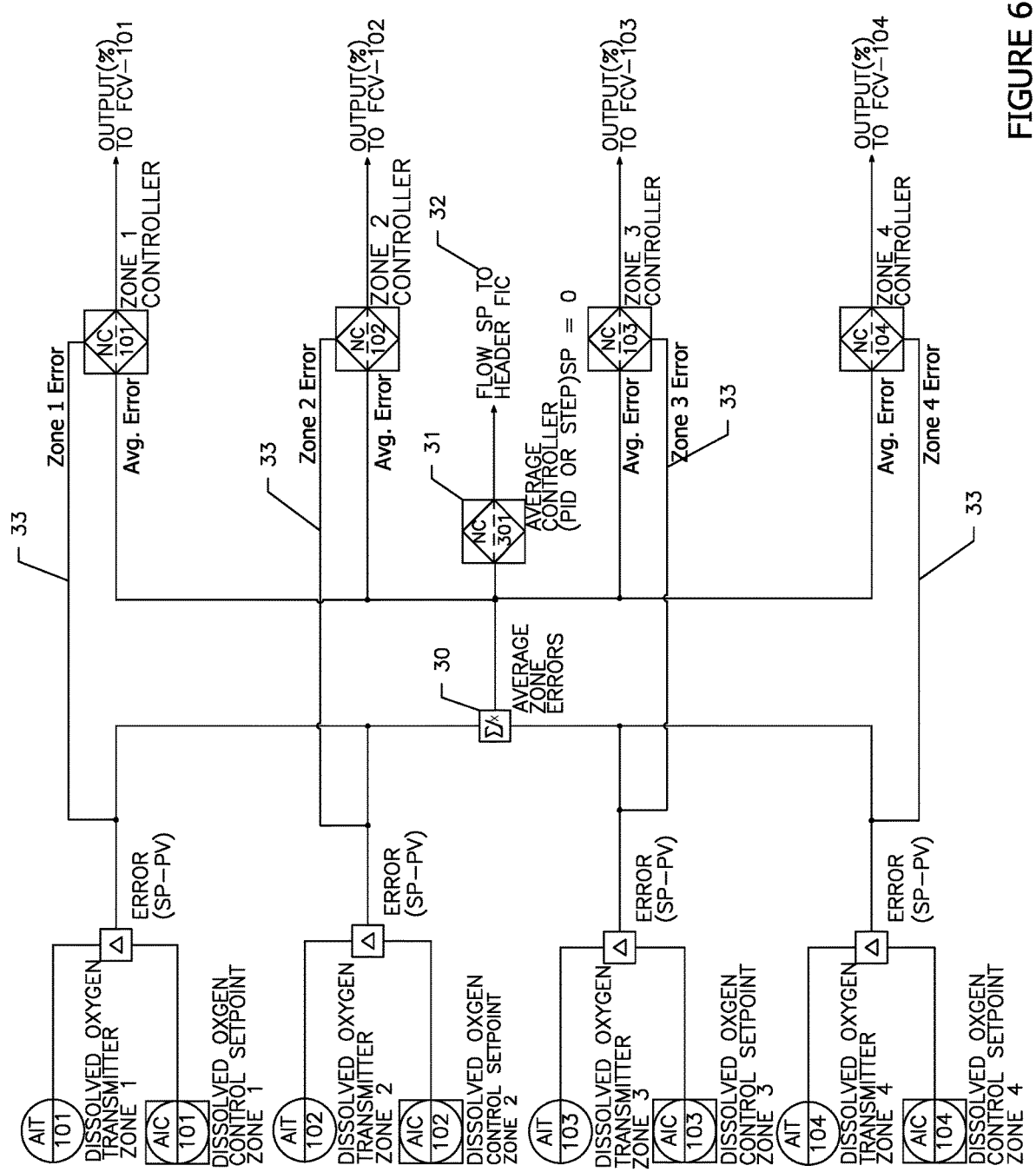
FIG. 6 is a schematic drawing showing an arrangement with an alternative to FIG. 2.

FIG. 6 represents an alternate embodiment of the balance controller. The system still uses the average of errors to control the overall flow demand for the system. However, rather than using a differential controller to control the distribution of air along the network, the system uses the average error as a set point for a battery of zone controllers. The elements are as follows:

The average controller functions in a manner identical to all other embodiments described above. The controller takes the average error of all zones as at 30. If the average error is negative, the controller increases the overall aeration of the system by increasing air flow, as at 31 and 32. If the average error is positive, the controller decreases total aeration The zone controllers (1 through 4) are responsible for adjusting the air distribution among zones so that the four exhibit essentially equal errors. Each controller functions independently, receiving a respective error signal as shown at 33, but shares a common setpoint with all other controllers. This setpoint is the average of the errors of all zones, which comes from the averaging indicated at 30. Zones which have an error that is more negative than the average will open their flows to increase aeration. Zones which have an error that is more positive than the average error will close their valves to force more air flow to other zones. This can be very accurate, in that a PID control, for example, includes a feedback loop with DO as input.

Under other embodiments, the function generators ensure that one or more valves on the distribution network are completely open. An air flow distribution network having all valves partially closed creates extra pressure loss which is wasted energy. To this end, in this embodiment, a most open valve controller ensures that one of the valves is always open. This logic is known to the industry, and a common element in wastewater aeration installations. In this application, the controller determines which of two or more zones is the most negative compared to the average error. This zone has its valve fixed at 100%. Should another zone valve open to 100% with an error that is more negative than the fixed valve, it will become the new fixed valve.

Invention Features

The invention disclosed has the following features or characteristics:
1. An individual setpoint for each individual zone or compartment.
2. Only one flow sensing instrument at the start of the common header is required for operation.
3. A flow control device is provided to control overall flow to the header. This could be a flow control valve at the start of a sub header in a multi-train installation, or even the compressor itself if only one train exists.
4. Since zones are controlled in relation to each other the effect of disturbances on downstream cells is kept to a minimum.
5. In a system with multiple trains, the number of elements interacting with the main header is reduced, increasing header stability.

Theory of Operation

Figure 4:
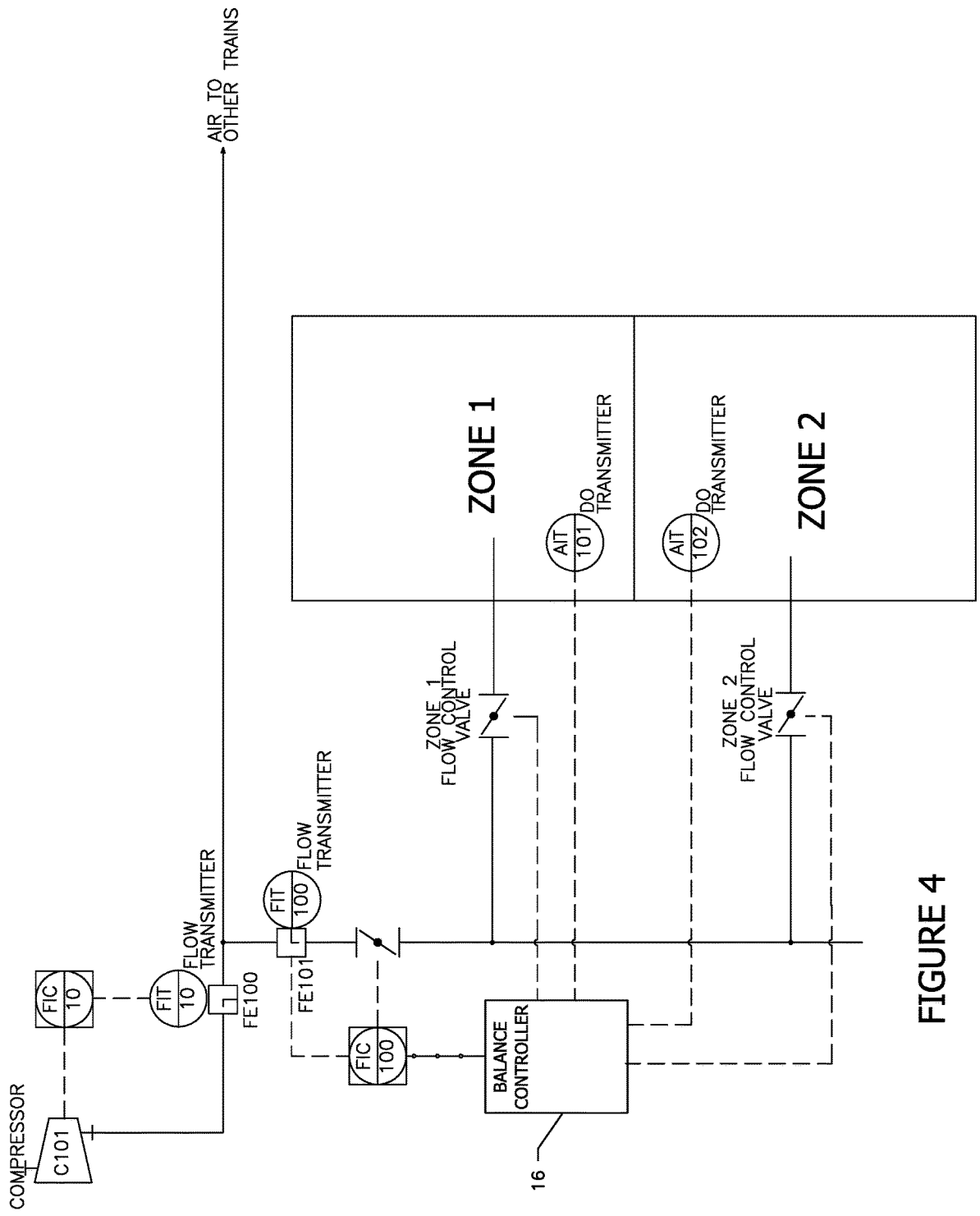
FIG. 4 is a schematic to further explain the components and function of the system of the invention.

FIG. 4 shows the necessary configuration for a diffused air oxidation ditch with two zones to function with a balance controller of the invention. The components required are:
1. A flow control device at the start of the header for the train (FC-100).
2. A flow instrument measuring total header flow (FT-100), working with the flow control device.
3. A balance controller 16 to balance deviations from setpoints in the two zones, equivalent to the differential controller 3 and function generator 4 in FIG. 1.
4. A control valve at the air drop for each zone (FCV 101, 102 in FIG. 1).
5. A DO analyzer for each zone (AT-101, -102), sending DO data to the balance controller.

To explain how the balance controller functions, several possible scenarios of system states will illustrate the operation.

In one example, one zone is high by a certain amount, and the other zone is low by about the same amount. In this instance since the average error of the two zones is almost zero, the average controller will make little to no change in the flow requested from the flow controller at the beginning of the header, i.e. little or no change to overall aeration flow. The system will begin opening the valve on the low zone. If the valve was already open fully, it will begin closing the valve on the high zone in order to direct more flow to the low zone. This change will not affect overall flow because the flow control FC-100 keeps flow constant.

In a situation where one zone is almost on setpoint, and the other zone is high, both controllers will act simultaneously. Since the average is above zero, the controller will reduce the flow requested from the flow controller, FC-101. As the overall flow is being reduced, the differential controller will begin opening the valve on the zone that is on setpoint unless it is already fully open, in which case it will begin closing the valve on the high zone.

In the two scenarios above, the controller function is viewed at a given moment of time. However, in real practice the controller balancing the two zones is tuned to respond much more quickly than the flow controller. This results in a situation where both zones usually have roughly the same amount of error. When this is the case, only the average controller changes the flow setpoint to bring both zones to their setpoints.

Other Applications

This balance controller could also be used in an orbital oxidation ditch with two low speed surface aerators. A DO probe would be located in the channel downstream of each aerator. The function generator instead of controlling valves would be used to increase/decrease the speed of each aerator in order to balance the DO error in each channel. The average controller would then bias the speed of both aerators up or down based on the average error of each probe. This arrangement provides an advantage over other methods of aerator speed control known to the industry. It is usually desired to have the DO in one of the channels high and the other low. This permits both nitrification and denitrification to be accomplished in the oxidation ditch. Using a separate DO controller for each aerator is problematic, as the output from one loop affects the other loop. This usually results in both aerators chasing each other with one slowing all the way down to minimum and the other speeding up to maximum speed. Then the aerator at maximum speed begins slowing down and the two eventually swap who is at minimum speed and who is at maximum speed. This induced oscillation is detrimental to DO control. All this is true with aeration flow valves as well, as in the scenarios discussed above.

With the balance controller, the action of both low speed aerators is coordinated, preventing this coupling effect from causing oscillations.

The invention applies to treatment zones other than those in an oxidation ditch. Any multiple-zone aeration situation, where DO is to be controlled for each respective zone, can benefit from the control system of the invention.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for controlling aeration air flow in a wastewater treatment system having a plurality of zones with sludge requiring aeration at preselected dissolved oxygen (DO) levels and wherein a change in DO level in one zone can affect DO level in a downstream zone, comprising:
    monitoring dissolved oxygen within the sludge of each of the plurality of zones individually, and comparing DO at each zone to a predetermined set point desired DO level for the respective zone, to calculate a positive or negative deviation from set point at each zone,
    calculating a shift in distribution of aeration for the plurality of zones to equalize deviations from set point of all zones,
    shifting distribution of aeration at the plurality of zones to substantially equalize deviations such that all zones are in balance by essentially equal deviations, without bringing all zones to set point,
    averaging the deviations from set point of the plurality of zones, and
    increasing or decreasing total air flow to the plurality of zones as needed to reduce the average deviation essentially to zero, bringing the DO all zones toward set point simultaneously.

2. The method of claim 1, wherein each zone comprises an oxidation ditch.

3. The method of claim 1, wherein aeration of the zones is provided by a low speed surface aerator.

* * * * *